Jan. 18, 1966  H. C. FRENCH ET AL  3,229,622
STATIONARY PACKER ASSEMBLIES
Filed April 22, 1963  11 Sheets-Sheet 1

INVENTORS
HENRY C. FRENCH,
CHARLES R. TOPPINS,
BY
ATTORNEYS

Jan. 18, 1966 H. C. FRENCH ETAL 3,229,622
STATIONARY PACKER ASSEMBLIES
Filed April 22, 1963 11 Sheets-Sheet 2

INVENTORS
HENRY C. FRENCH,
CHARLES R. TOPPINS,
BY
ATTORNEYS

Jan. 18, 1966 H. C. FRENCH ETAL 3,229,622
STATIONARY PACKER ASSEMBLIES
Filed April 22, 1963 11 Sheets-Sheet 6

INVENTORS
HENRY C. FRENCH,
CHARLES R. TOPPINS,

BY
ATTORNEYS

Jan. 18, 1966   H. C. FRENCH ETAL   3,229,622
STATIONARY PACKER ASSEMBLIES
Filed April 22, 1963   11 Sheets-Sheet 11

INVENTORS
HENRY C. FRENCH,
CHARLES R. TOPPINS,
BY
ATTORNEYS

United States Patent Office 3,229,622
Patented Jan. 18, 1966

3,229,622
STATIONARY PACKER ASSEMBLIES
Henry C. French and Charles R. Toppins, Knoxville, Tenn., assignors to Dempster Brothers, Inc., Knoxville, Tenn., a corporation of Tennessee
Filed Apr. 22, 1963, Ser. No. 274,574
14 Claims. (Cl. 100—214)

This invention relates to improvements in stationary packer assemblies such, for example, as those used for packing refuse into containers, bodies or vehicles for hauling to a remote point of ultimate disposal.

It has been the practice heretofore to locate containers and vehicle bodies in proximity to respective points of accumulation of trash and other refuse. The refuse is dumped into the body, and at intervals the body is picked up on the vehicle and hauled to the remote point where its contents are dumped. Frequently, this involves transportation over relatively long distances over city streets and along highways where the point of ultimate disposal is remote from the point of collection. This requires a great amount of driver time and vehicle use, frequently hauling a relatively small quantity of refuse in the container or body.

In an attempt to provide more economic use of the driver and vehicle, many vehicles are equipped with compaction apparatus within the body, so as to increase materially the quantity of refuse that can be packed therein to maximum capacity for transportation to the point of ultimate disposal. Where the container or body is of relatively large capacity, this requires a compaction head located in the body of substantially the same area as the area of the body and with attendant power mechanism for operating the head or other compaction means. Not only does this add greatly to the cost of the container or body, but its use is restricted to that one container or body.

One object of this invention is to provide a stationary packer assembly which can load refuse into separate containers or bodies brought into proximity thereto and coupled thereto, one at a time, so as to pack the maximum quantity of refuse in each container or body for transportation to the point of ultimate disposal. The one packing unit can be appreciably smaller than that heretofore used in compaction-type bodies and therefore less expensive, and at the same time it will service a considerable number of containers or bodies while effectively compacting the refuse therein.

Another object of the invention is to improve the construction of stationary packer assemblies to enable an assembly to be used in conjunction with a receptacle or container for delivering refuse into the latter and compressing it therein.

Still another object of the invention is to provide a self-contained stationary packer assembly of relatively simple and inexpensive construction and which is self-contained but capable of delivering or supplying refuse into a separate body or container and packing it therein under pressure.

These objects may be accomplished, according to one embodiment of the invention, by providing an opening in a side wall of a container or body and with a stationary packer assembly disposed at the opening to direct refuse therethrough under pressure. The packer assembly is capable of being connected to the container or body when brought into juxtaposition with respect to each other, so as to operate as a single unit, one part of which receives the refuse and the other part forces the refuse into said container or body under pressure.

The packer assembly includes a charging tube, with a packer assembly operatively mounted on guides provided at spaced portions of the charging tube. The guides preferably extend into the opening in the container or body and direct a packer head to a position where the refuse is compressed by the head in the container or body upon reciprocating movement of the head therein. Suitable power means such, for example, as a hydraulic cylinder, is connected with the head for operating the latter in a reciprocating movement.

This embodiment is illustrated in the accompanying drawings, in which:

FIG. 12a is a cross section similar to FIG. 11, but showing a modification in the shear plate.

The stationary packer assembly is adapted for use in conjunction with a suitable refuse receptacle, such as a container or body, generally designated by the numeral 1, and of any suitable construction for receiving and containing trash and other refuse therein to be loaded onto a vehicle or coupled therewith for transportation to a point of ultimate disposal at which the trash or other refuse is removed from the container or body. Any suitable means may be provided on the container or body 1 to enable the container to be coupled therewith or to pick up the container or body for transportation and for dumping.

Figures 1, 2:
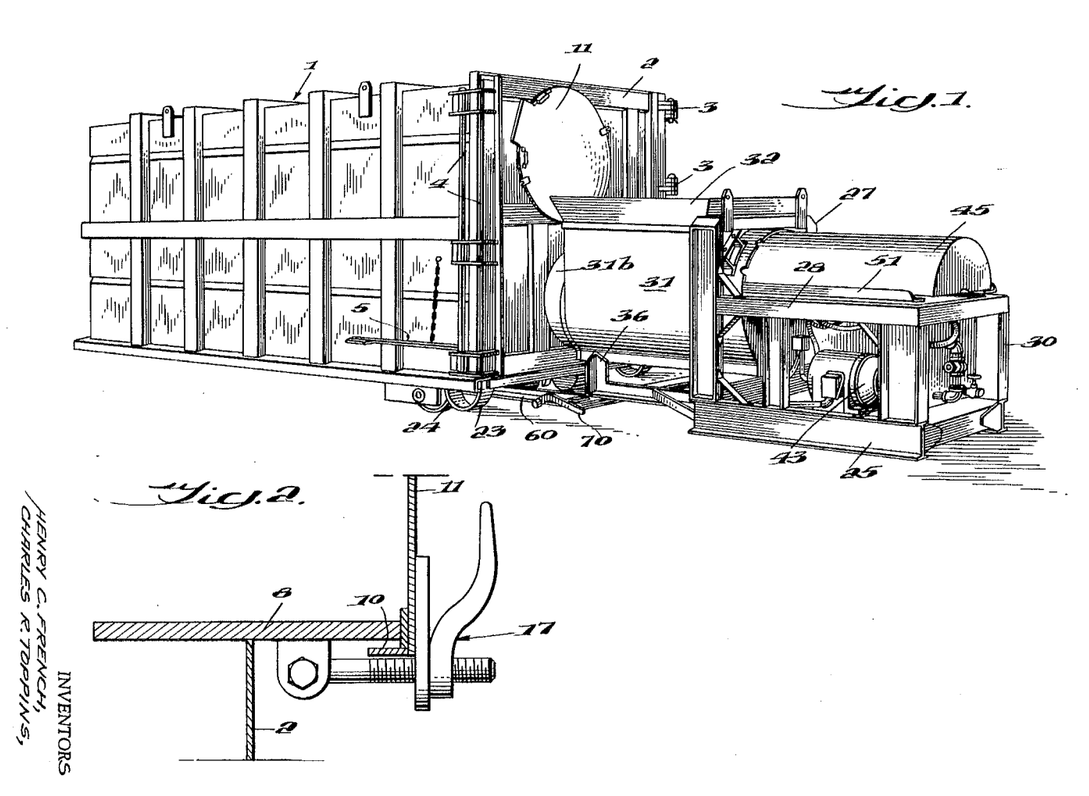
FIG. 1 is a perspective view of the stationary packer assembly in coupled relation with a container or body.
FIG. 2 is a detail cross section on the line 2—2 in FIG. 5.

In the illustrated embodiment shown in FIG. 1, the container is substantially of the size of a conventional chassis frame so as to be mounted thereon. In the form shown in FIG. 1, the container or body 1 has the surrounding sides including the top and bottom thereof closed, and it is closed at the left-hand end. The right-hand end of the container or body has a door 2 hingedly mounted thereon at 3, capable of swinging open for discharging the contents at the point of ultimate disposal. The door 2 forms the end wall of the body or container, but is held in a closed relation usually by a series of catches, generally indicated at 4, normally locked closed but capable of being opened by a hand lever 5.

Figure 5:
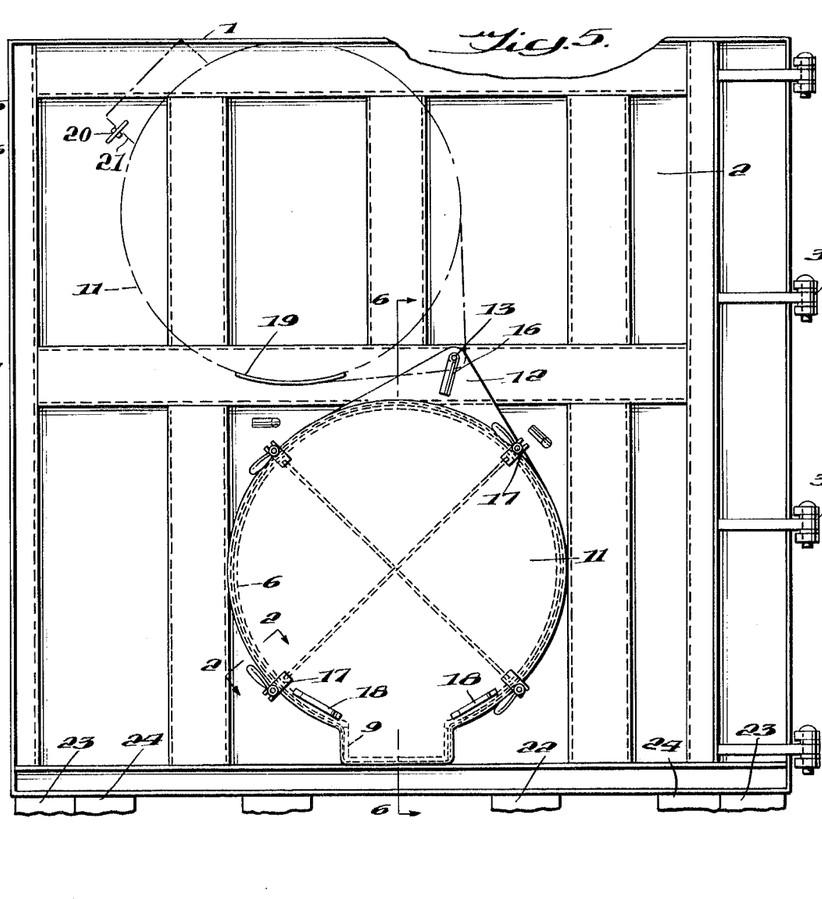
FIG. 5 is an end elevation of the container or body detached, with the closure over the filling opening therein.
Figure 6:
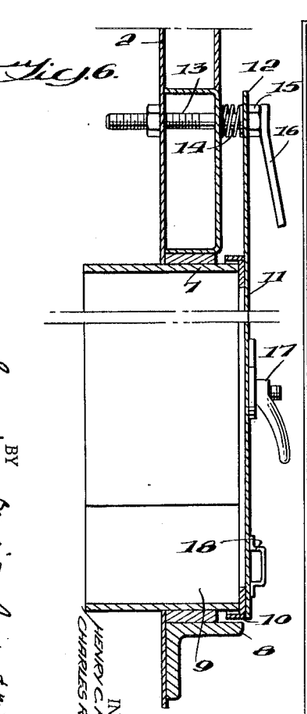
FIG. 6 is a vertical cross section through the filling opening and closure on the line 6—6 in FIG. 5.

As shown in FIGS. 5 and 6, the door 2 at an end of the body or container 1 is provided with an opening 6, formed by mounting a sleeve 7 within a frame 8, suitably mounted on the face of the door 2. The sleeve 7 projects appreciably into the body 1 so as to form an elongated passage on the door 2. The lower end portion of the sleeve 7 is offset to form a sump 9. These parts are fixed securely to the door 2 and form a part thereof, defining the opening 6 therethrough. A surrounding ring 10 is secured to the frame 8 and forms a striker plate for a cover thereon.

The cover is indicated generally at 11 and is in the form of a plate, so formed as to cover the opening 6 including the sump 9. One segment of the door 11 is offset at 12 and is hinged upon a mounting bolt 13 secured within the frame structure of the door 2, as shown in FIG. 6. The cover segment or ear 12 is disposed around the bolt 13 between a coiled spring 14 and a nut 15, which latter is capable of being tightened against the tension of the spring 14 by a handle 16. This increases the tension on the cover and aids in holding it securely against the striker plate 10 when the container or body is separated from the packer assembly.

Provision is also made for locking the cover 11 in closed position over the opening 6. A plurality of toggle latches are indicated generally at 17 and are spaced at intervals around the cover 11 for adjustably securing the door against the striker plate 10 in the manner that will be obvious from FIG. 2 of the drawings.

As shown in dotted lines in FIG. 5, the cover 11 may be moved to an open position about the hinge bolt 13, so as to uncover the opening 6. The cover is provided with handles 18 for movement to open and closed positions. In the open position, the cover is supported by a support bar 19 secured on and projecting from the face of the door 2.

The cover 11 is provided with a latch assembly, generally indicated at 20, on a portion thereof in position to engage an abutment 21 on the door 2 when the cover is in its open position for holding the cover open. Any suitable latch assembly may be used for the purpose but, as illustrated, this includes a spring-tensioned latch that will normally tend to hold the door in open position.

In the illustrated embodiment of container 1, the latter is supported on a pair of runners 22 extending lengthwise beneath the bottom thereof, and additional coupling means may be provided on the bottom for connection with suitable elevating mechanism which is well known in the art. In addition to the runners 22, the packing end of the body or container 1 may be provided with feet 23 and/or rollers 24, as shown generally in FIG. 1. The transport vehicle usually will pick up the body or container at the end opposite these parts, so that the discharge opening, closed by the door 2, will be at the rear end of the vehicle when the container or body is transported thereon.

The packer structure comprises a supporting frame which may be bolted or secured rigidly to a supporting foundation or be portable in the manner described above for the body or container 1. This frame includes supporting sills 25 and cross brace members 26 between the opposite ends of the sills 25. At one end of the sills 25 is an upright frame, generally indicated at 27, braced at opposite sides by longitudinal beams, generally indicated at 28, which beams are connected at their opposite ends by a cross member 29 and upright supports 30. These parts may be welded or otherwise secured in rigid relation so as to form a secure structure.

Figure 8:
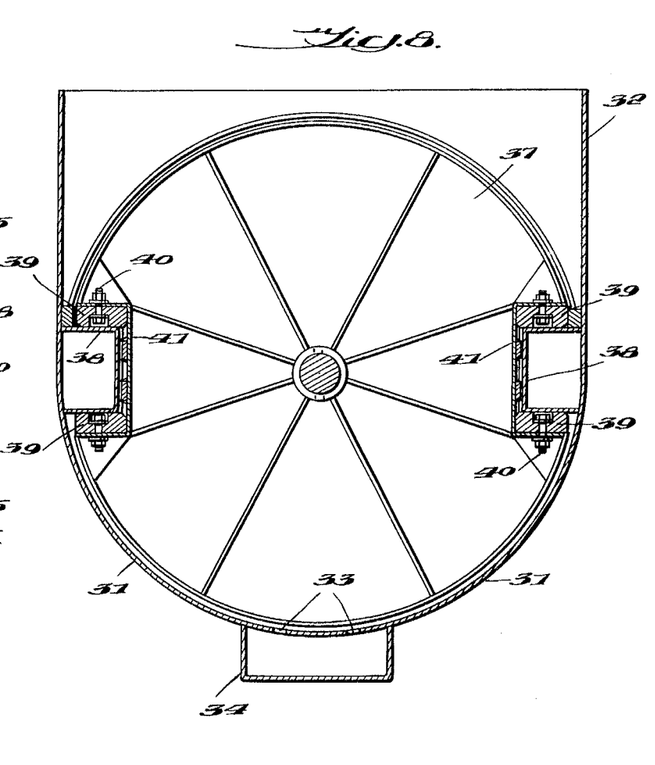
FIG. 8 is a cross section through the charging tube, showing the packer and guides therein.

At one end of the frame structure 25–30, toward the body or container 1, is a charging tube, generally indicated at 31. As shown in FIG. 8, the charging tube 31 is illustrated as substantially U-shaped in cross section in its intermediate portion and with cylindrical projecting end portions 31a and 31b. The U-shaped portion 31 has an open top to permit the material to be dumped therein. This top portion may be provided with a hopper 32, as shown, to facilitate the dumping of the material into the charging tube.

Inasmuch as refuse material often includes some liquid, the charging tube 31 may be provided with drain openings 33 in the bottom thereof over a sump portion 34 attached to the bottom of the charging tube 31. This sump portion is shown as formed of a channel section extending lengthwise of the charging tube 31 substantially throughout the length thereof.

The charging tube 31 is supported at one end by having its cylindrical portion 31a mounted in the frame 27. The opposite end 31b of the charging tube 31 is confined by a wrapper bar 35 and is mounted on a supporting frame 36 extending lengthwise of the assembly from the frame members 25–27, so as to hold the charging tube 31 securely in projected relation.

Operatively mounted within the charging tube 31 is a head 37 in the form of a piston operatively mounted therein. The packer head 37 is mounted on a pair of guides 38 forming rails along opposite sides of the charging tube 31. These rails are secured rigidly to opposite sides of the charging tube and project inwardly therefrom. Mounted on the rails 38 at the top and bottom of each are guide shoes 39 secured by bolts 40 to a channel shaped member 41 connected with the packer head 37 on each opposite side thereof. In this way the packer head 37 is supported for reciprocating movement lengthwise of the charging tube 31 for feeding material into the body or container 1 and applying pressure thereto.

Figure 3:
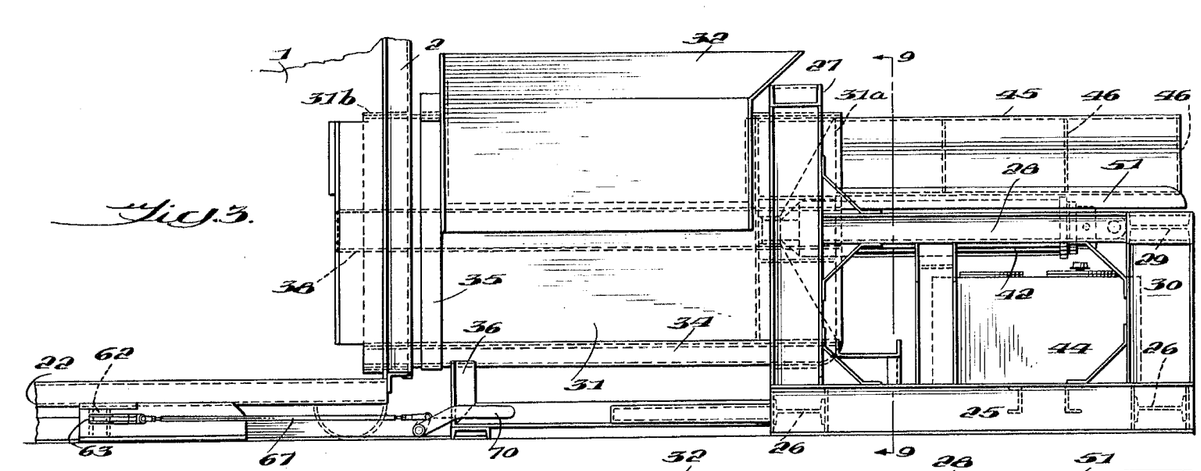
FIG. 3 is a side elevation of the stationary packer assembly, with a portion of the container or body coupled thereto.
Figure 4:
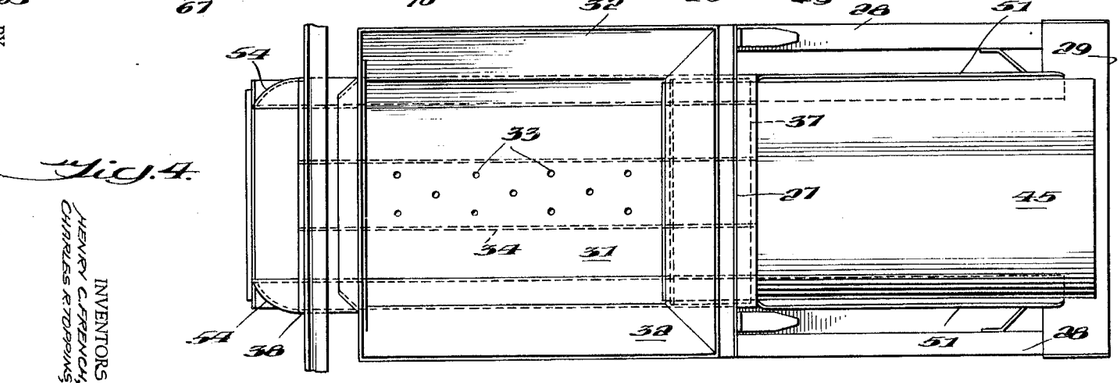
FIG. 4 is a top plan view of the stationary packer assembly.
Figure 7:
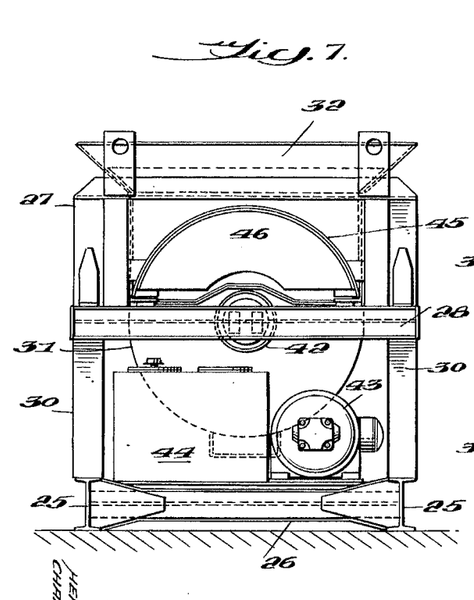
FIG. 7 is an end elevation of the packer assembly.

The power means for effecting this reciprocating movement of the packer head 37 is shown in the form of a power cylinder 42 extending lengthwise of the frame structure, as illustrated in FIG. 3, being connected at one end with the packer head and at the opposite end with the cross frame member 29. In order to operate the cylinder 42 hydraulically, a power pump is shown generally in FIG. 7 at 43 and connected with a source of liquid 44 supported by the frame structure, with suitable means in the form of valves to control the operation. The valve control means may provide for movement of the packer head 37 under manual control or automatically, as desired, moving continuously back and forth to compress the material in the charging tube 31 into the body or container 1.

Also connected with the packer head 37 is a material shield, generally indicated at 45. This shield is in the form of a cylinder segment connected at one end with the packer head 37 and braced by web plates 46 at intervals along the length thereof.

Figures 13, 14, 15:
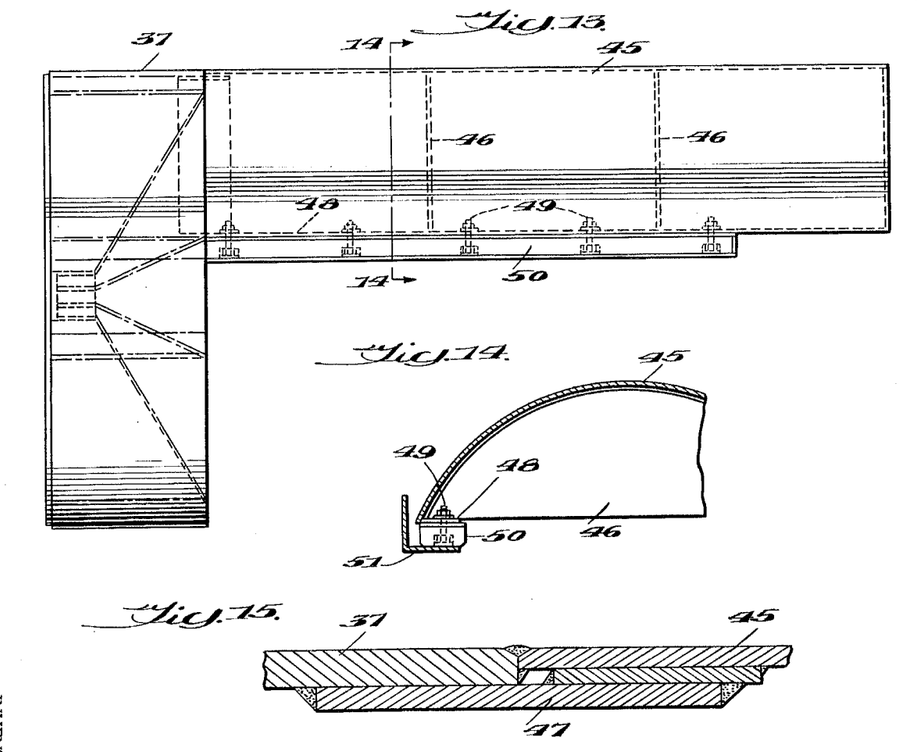
FIG. 13 is a side elevation of the packer head and shield assembly detached.
FIG. 14 is a detailed cross section therethrough on the line 14—14 in FIG. 13.
FIG. 15 is a detailed longitudinal section through a portion of the packer head and shield.

The shield 45 is shown in FIG. 13 as extending in axial alignment with the top segment of the packer head 37, so as to form a continuation thereof at the top. The hopper 32 has opposite end walls, the lower edges of which are shaped to conform substantially to the peripheries of the packer head 37 and the shield 45. Thus, when the packer head and shield are all the way forward, the hopper 32 is closed at the bottom to receive material deposited therein.

These parts are securely welded together by a wrapper sheet, generally indicated at 47. Thus, upon reciprocating movement of the packer head 37 in the charging tube 31, material can be dumped on top of the shield 45 and will not fall behind the packer head 37. However, upon withdrawing movement of the packer head 37 to the position shown in FIG. 3, this material will drop into the charging tube to be ejected under pressure on the next stroke of the packer head.

Provision is made for guiding the movement of the shield so as to assure of smooth operation. Accordingly, at each opposite edge of the shield 45, a plate member 48 is secured rigidly thereto and, from the plate member 48, is suspended by bolts 49 a runner 50 in the form of an elongated shoe which travels back and forth on a guide 51.

Figure 9:
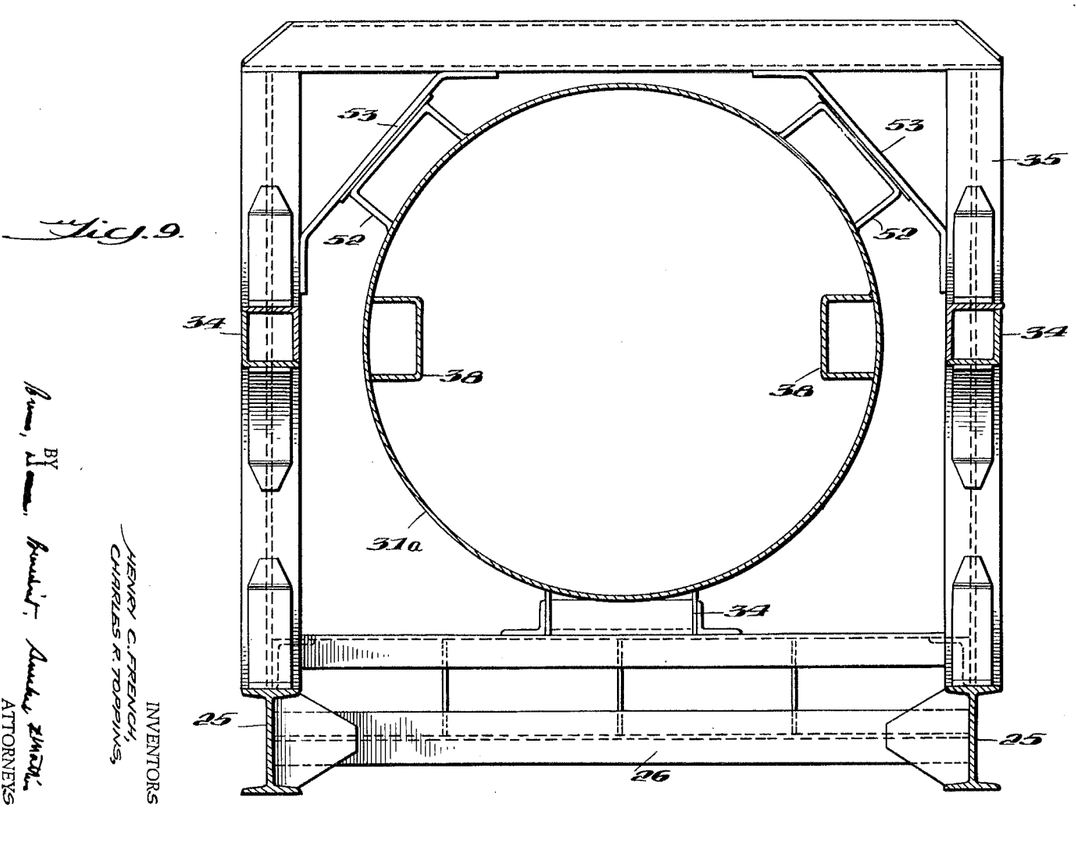
FIG. 9 is a cross section through the mounting for the charging tube taken on the line 9—9 in FIG. 3.

At its forward end, the charging tube 31 is securely braced within the frame 35, as shown in FIG. 9. Anchor members 52 are connected with upper portions of the charging tube 31 to be secured in place against diagonal portions 53 of the frame.

Figure 16:
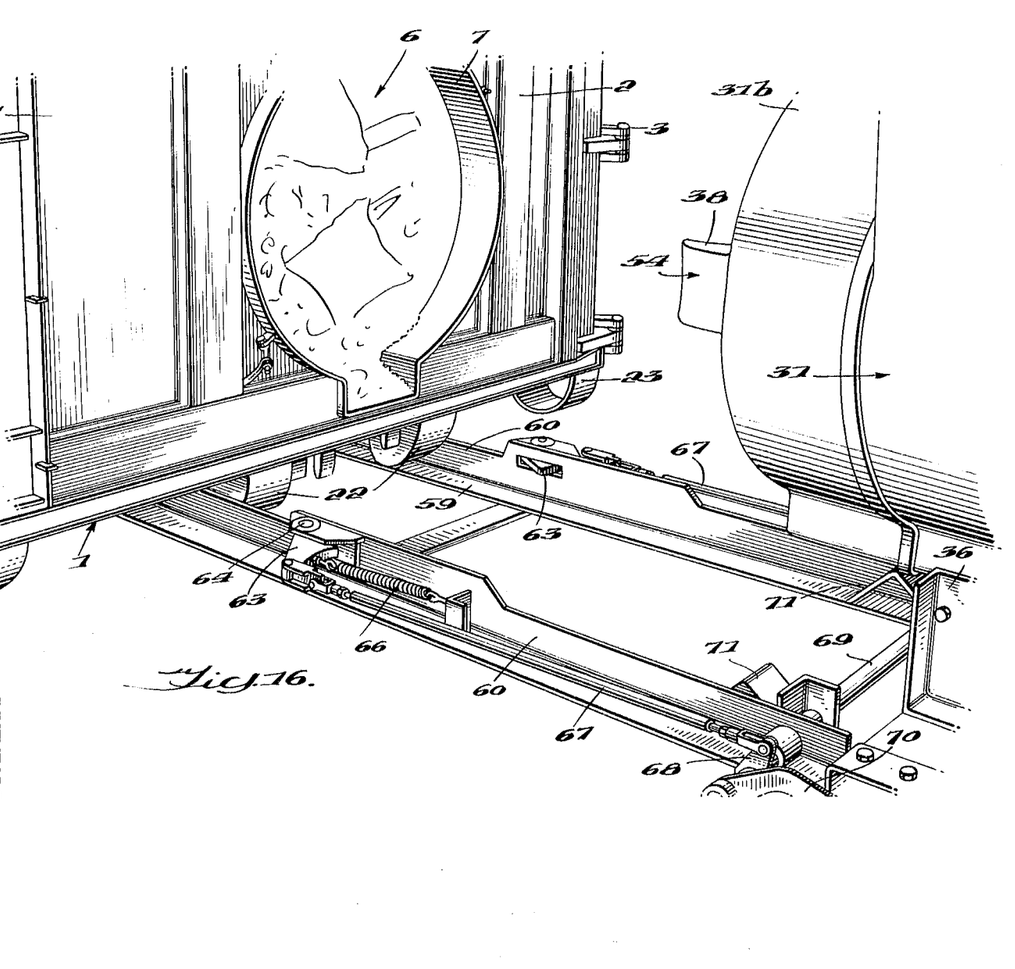
FIG. 16 is a partial perspective view of the packer assembly and body separated.

The guides or tracks 38 project beyond the end of the charging tube 31 (see FIGS. 3 and 16) so as to extend through the sleeve 7 that surrounds the opening 6 in the container or body 1 when the parts are in assembled relation for operation, as will be apparent from FIG. 3. The forward ends of the track 38 are bevelled or rounded off, as indicated at 54, to facilitate the movement thereof into the sleeve 7. This relation permits operation of the packer head 37 to a substantial extent into the body or container 1 so as to compress the material therein and also to reduce the tendency of the material to fall out of the opening 6 when the container or body is withdrawn from its connected relation with the packer assembly.

Figures 10, 11, 11A, 12:
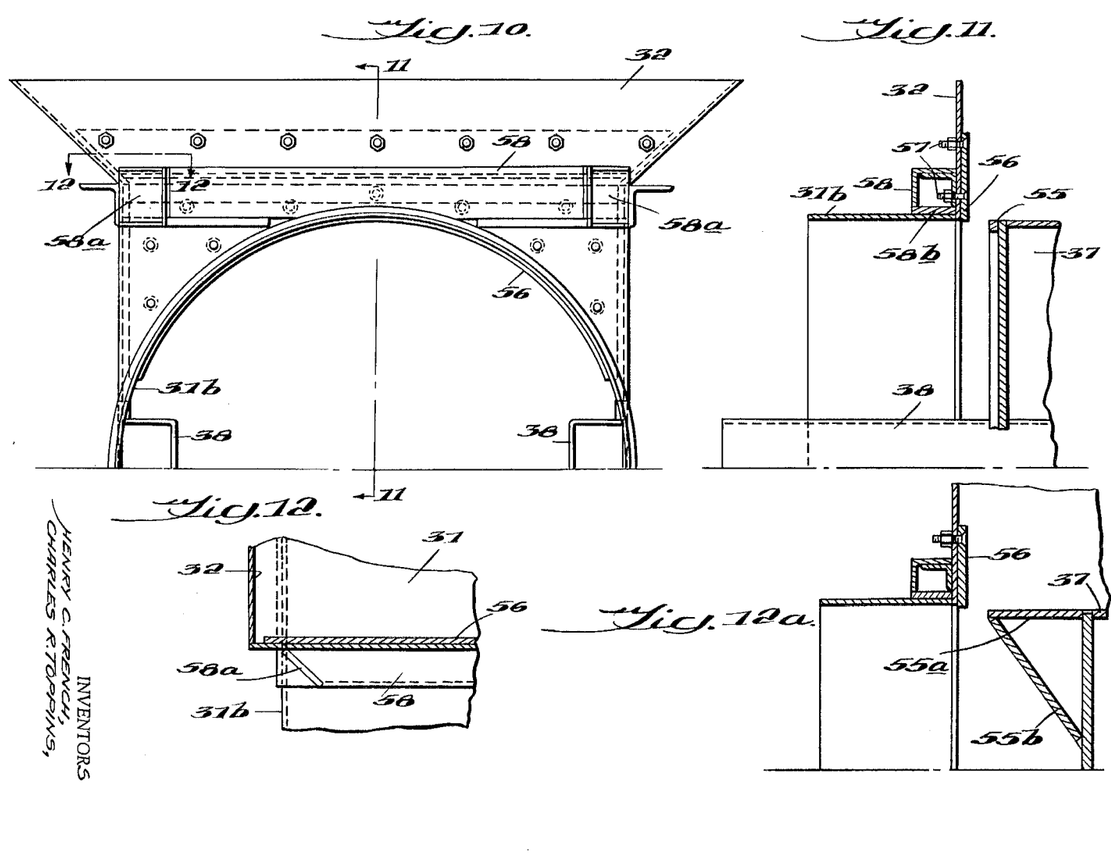
FIG. 10 is a detailed view, showing the installation of the shear plate and reinforcing structure, with parts omitted for clearness of illustration.
FIG. 11 is a cross section therethrough on the line 11—11 in FIG. 10.
FIG. 12 is a detailed cross section on the line 12—12 in FIG. 10.

Extending about the outer edge of the packer head 37 on the face thereof toward the body or container is a shear bar 55. This bar 55 acts in opposed relation to a shear blade 56 that is secured to an end wall of the hopper 32, as shown in FIGS. 10 and 11. The shear blade 56 is preferably detachably mounted on the hopper 32 as by bolts 57, so as to permit separation and removal thereof when replacement is desirable for sharpening or otherwise. In opposed relation to the upper portion of the shear blade 56 is a boxing structure 58 extending across the end portion of the charging tube 31 for strengthing this portion of the hopper and charging tube assembly at the point where stress is placed thereon by the shearing action and pressure into the container or body. The boxing structure 58 is braced at opposite ends by end plates 58a, and is joined to a wrapper bar 58b.

In place of the shear bar 55, a shear plate 55a may be used, attached to the front end of the packer head 37 and projecting forwardly therefrom, as shown in FIG. 12a. This shear plate 55a extends about the upper segment of the packer head and may be braced, if desired, by an angular plate 55b extending between the forward edge thereof and the end face of the packer head 37. This shear plate 55a coacts with the shear blade 56 for shearing material which will naturally accumulate between the packer plate and the hole through which the material is pushed into the separate container.

Figures 17, 18, 21:
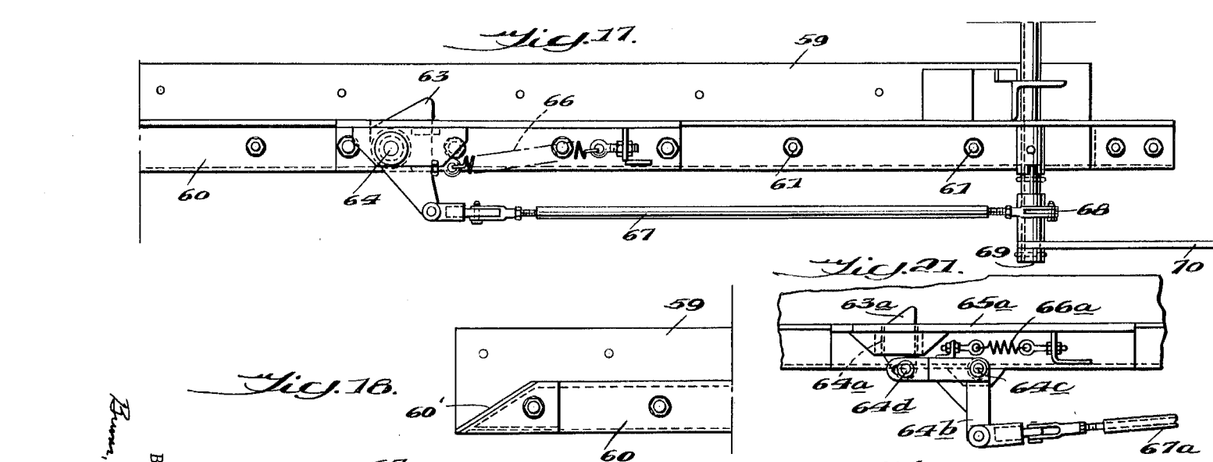
FIG. 17 is a top plan view of the guide rail and lock assembly.
FIG. 18 is a detailed plan view of the guide end of the rail.
FIG. 21 is a detailed top plan view of the lock station, showing a modified form thereof.
Figures 19, 20:
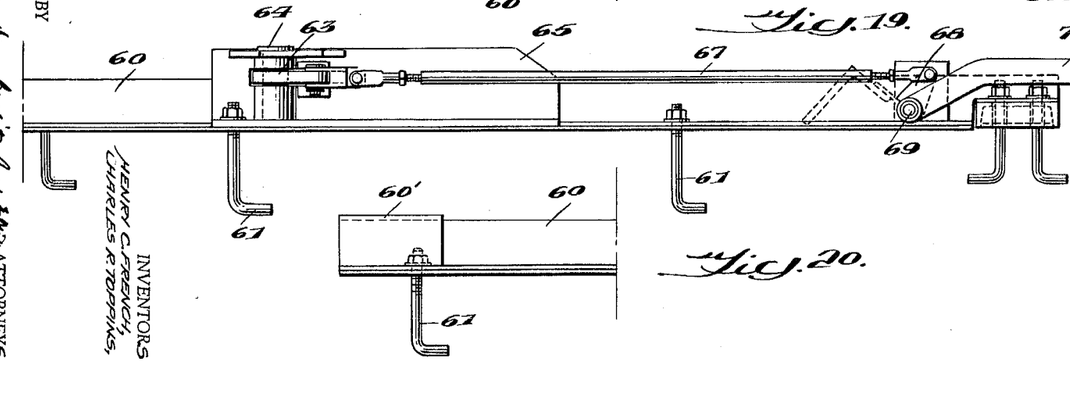
FIG. 19 is a side elevation of the portion shown in FIG. 17.
FIG. 20 is a similar view of the end portion of the guide rail assembly.

As shown in FIGS. 3 and 16 to 20, the supporting frame assembly 36 has means connected therewith for guiding the container or body 1 into proper aligned relation with the packer assembly. This means comprises guide members, generally indicated at 59, adapted to receive thereon the runners 22 of the under-carriage of the body or container 1 and are confined by lateral guides 60. As shown in FIG. 18, the lateral guides have bevelled ends 60' to facilitate the guiding of the undercarriage on the guide members 59. This guiding structure is provided on opposite sides of the longitudinal center of the body or container 1, so as to provide a pair of guides suitably spaced apart according to the disposition of the members of the undercarriage, whereby suitable means will hold the body or container in proper relation with respect to the packer assembly. These parts are securely anchored in place in the foundation or other supporting structure by anchor bolts generally indicated at 61.

The interconnected runners 22 of the undercarriage of the body or container 1 are provided with openings 62 therein (FIG. 3) so disposed as to receive locking segments 63 when the body or container is in proper operative relation to the packer assembly. The locking segments 63 are pivotally mounted at 64 on an upstanding section 65 of a frame member 59 for swinging movement in a horizontal plane into and out of locking relation with an adjacent recess 62. The locking segments 63 normally are spring pressed into locking positions, coiled springs 66 being shown as connected thereto normally tending to urge these to the position shown in FIG. 17. These locking segments can be withdrawn by links 67 connected with the segments 63 and extending to arms 68 on a cross shaft 69 which is thus connected with the links 67 of both laterally spaced locking segments 63. A hand lever 70 on one end of the shaft 69 provides for manual operation of the shaft to release the segments 63 from interlocked engagement with the openings 62 in the undercarriage of the body or container 1.

This packer assembly is adapted to be used with existing containers or bodies for handling refuse without requiring compaction means in the body itself. The packer assembly is mounted in a stationary position during operation and the container or body is brought into juxtaposition with respect thereto, the guided relation between these parts assuring of proper disposition during the operation.

When the container or body 1 is moved into position for alignment with the packer assembly, the cover 11 is moved to its open position, illustrated in full lines in FIG. 1 and in dotted lines in FIG. 5, where it is retained in such open position by the support bar 19 and latch assembly 20. Then the sliding of the runners 22 in guided relation with the members 59 and 60 will cause the sleeve 7 surrounding the filling opening 6 to be telescoped over the projecting end of the charging tube 31 in the relation shown in FIG. 3.

The guides 38 for the head 37 will project substantially through the length of the sleeve 7, as shown therein. When these parts are brought into proper relation, the latching segments 63 will engage in the openings 62 in the undercarriage of the body or container 1 and thereby hold the assembly in latched relation thereto. Stops 71 (FIG. 16) on the guides 59 will limit the sliding movement of the container or body 1 relative to the packer assembly.

Then the material can be charged into the hopper 32 for direction into the charging tube 31. The packer head 37 can be operated continuously, if desired, moving back and forth in successive strokes throughout its path, or it may be manually operated as the charging tube is filled. In either event, the packer head will force the material from the charging tube 31 into the body or container 1 under pressure and continue thus filling material into the body or contatiner until the maximum capacity has been effected. The filling operation can continue during packing, by throwing or depositing material over the shield 45 as the packer head moves through the charging tube 31 and into the body. Then, upon the back stroke of the packer head 37, the withdrawal of the latter from the charging tube 31 will permit the material in the hopper 32 to fall into the charging tube for direction into the body or container 1 upon the next stroke of the charging head.

Any large objects not readily compressible may be sheared off during the charging operation between the shear bar 55 or plate 55a and the shear blade 56. Large pieces of wood, crates and other objects thus may be reduced to proper dimensions for compression and packing in the body or container.

This operation will continue until the body or container has been filled to maximum capacity or all of the available refuse packed therein. Then, upon release of the lever 70, the locking segments 63 will disengage the undercarriage of the body or container and permit the latter to be withdrawn from the packer assembly. As soon as the body or container is moved away from the packer assembly so that the charging tube is withdrawn from the opening 6, the cover 11 can be moved from its open position to the closed position shown in full lines in FIG. 5 where it is locked in place by the locking members 17, as shown in FIGS. 2 and 5. Then, the body or container can be transported to the point of ultimate disposition of the refuse.

The packer assembly can be used in any stationary position and located near a dock or other elevated point for accumulation of refuse, or whereever filling is desired. Loading hoppers can be custom engineered to meet the needs of the user of the equipment or hand filling of the refuse into the hopper may be accommodated.

A modified form of guide track lock is shown in FIG. 21, wherein a latch 63a is slidably mounted in a guideway 64a formed in the upstanding section 65a. A bellcrank lever 64b is pivotally mounted at 64c and one end thereof has a lost motion connection, as by a pin and slot, generally indicated at 64d, with an end of the locking segment 63a. The opposite end of the bellcrank lever 64b is connected with linkage 67a by means of which the locking segment is actuated in the manner and for the purpose described above. A coiled spring 66a is connected with the bellcrank lever 64b normally tending to swing the bellcrank lever in a direction to cause the locking segment 63a to be projected into the path of the portion on the container to be locked thereby.

Figure 22:
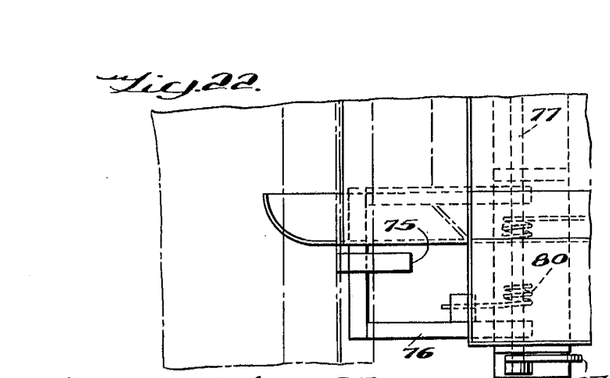
FIG. 22 is a partial top plan view of a further modified form of lock assembly and container.
Figure 23:
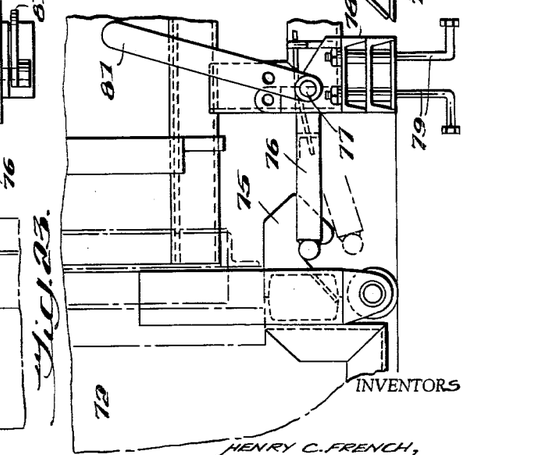
FIG. 23 is a side elevation thereof.
Figure 24:
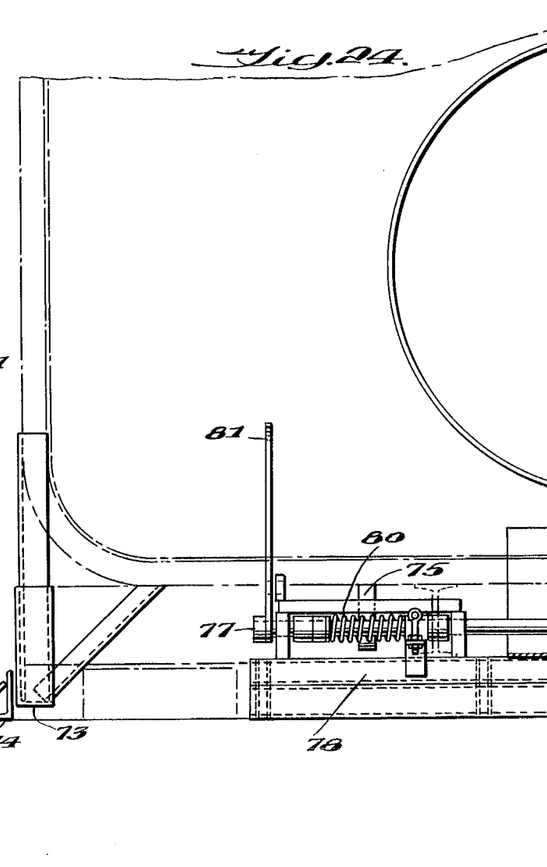
FIG. 24 is an end view thereof, with parts broken away and in section.

In the modified form shown in FIGS. 22 to 24, a container 72 is illustrated which is provided with guide angles 73 on opposite sides thereof adapted to be moved between a pair of angle bar assemblies, indicated at 74 in FIG. 24. The angle bar assemblies are mounted in stationary positions, projecting forwardly from the packer assembly in position to receive the container 72 therebetween.

On opposite sides of the opening provided in the end of the container 72, there are secured to the frame of the container hooks 75 projecting from the end of the container, as illustrated in FIGS. 22 to 24. Each of the hooks is in position to be engaged by a bail-type lock 76. The bail-type locks 76 for the respective hooks 75 are mounted on a cross shaft 77, journaled on a rail assembly 78, suitably anchored to the foundation of the stationary packer assembly as by angle bolts 79. A coiled spring 80 is wound about the cross shaft 77 normally tending to turn the shaft in a direction to cause the bail-type locks 76 to engage in the hooks 75 and to return these locks to engaging positions. A hand lever 81 is connected with the cross shaft 77 for swinging this shaft in a direction to disenage the bail locks from the hooks 75.

With the parts in connected and assembled relation, the packer assembly is operated substantially as described above.

Figure 25:
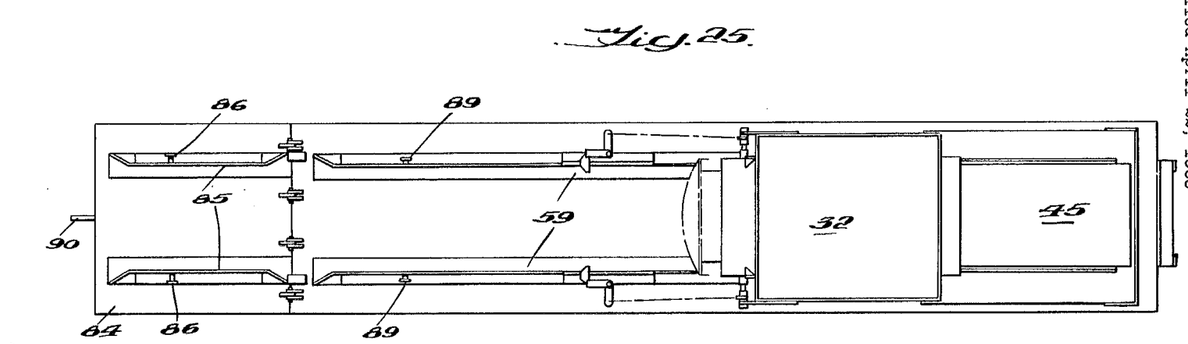
FIG. 25 is a top plan view, showing a further modification of the supporting assembly and packer.
Figure 26:
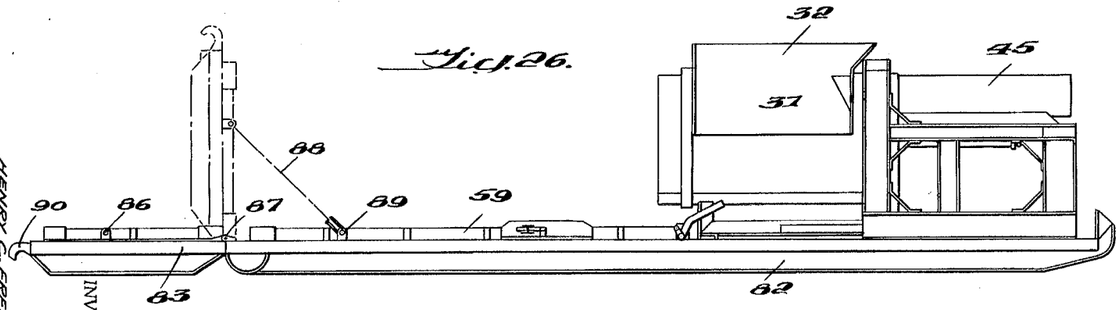
FIG. 26 is a side elevation thereof.

A further modification is illustrated in FIGS. 25 and 26, wherein an undercarriage assembly is illustrated generally at 82, comprising a pair of runners spaced apart and suitably braced and connected together so as to form a support assembly for the entire packer and container and to provide portability for the packer assembly.

The packer assembly is mounted on one end portion of the undercarriage 82, as described above. Guide rails 59 project forwardly from the packer assembly, adapted to receive the separate container thereon in the manner described above and for movement of the container into receiving relation with the packer. Thus, the undercarriage 82 supports both the container and the packer assembly and provides for compact relation of the parts of the mechanism and for moving these without disturbing the relation therebetween.

At the outer end of the undercarriage, an extension platform may be provided, if desired, as indicated at 83. This extension platform is provided with a flat top surface, shown generally at 84, and may have a pair of guides 85 supported thereon, if desired. The guides 85 are shown as provided with laterally projecting pins 86.

The platform 83 is pivotally connected at 87 to the adjacent end of the undercarriage assembly 82, capable of swinging to the dotted line position shown in FIG. 26. In this raised position, the platform may be held by a chain 88 extending upwardly from anchors 89 on the undercarriage assembly and formed in a loop around the pins 86, so as to hold the platform raised.

At its opposite edge, the platform 83 is provided with a hook 90 in position for engagement by a bail of a loader assembly, so as to pull the entire device up an inclined or tilting frame on a vehicle and thereby to move it to a supported position on the vehicle for transportation.

While the invention has been illustrated and described in certain embodiments, it is recognized that other variations and changes may be made therein without departing from the invention as set forth in the claims.

We claim:
1. The combination with a stationary packer assembly comprising a charging chamber adapted to receive refuse therein, and a packer head operatively mounted in the chamber, of a receptacle having a filling opening in a side thereof, guides on the sides of the charging chamber and projecting therefrom into and through the filling opening and supporting the packer head thereon, and means for operating the packer head on the guides into the receptacle for forcing refuse therein under pressure.

2. The combination with a stationary packer assembly comprising a charging chamber adapted to receive refuse therein, and a packer head operatively mounted in the chamber, of a receptacle having a filling opening in a side thereof, a cover plate pivotally mounted on the receptacle externally thereof in position to swing into a closed position over the filling opening when the receptacle is detached from the packer assembly, guides on the sides of the charging chamber and projecting therefrom into and through the filling opening and supporting the packer head thereon from reciprocating movement, and means for operating the packer head on the guides into the receptacle for forcing refuse therein under pressure.

3. The combination with a stationary packer assembly comprising a charging chamber adapted to receive refuse therein, and a packer head operatively mounted in the chamber for movement along a path, of a receptacle having a filling opening in a side thereof, guide members connected with the packer assembly and projecting forwardly therefrom substantially parallel to the path of said packer and in position to receive the receptacle thereon, said receptacle having locking shoulders beside the guide members and segments pivotally mounted on the guide members in positions for interlocking engagement with the shoulders to hold the receptacle in aligned relation with the packer assembly and to lock the receptacle against longitudinal movement along said guide members.

4. The combination with a stationary packer assembly comprising a charging chamber adapted to receive refuse therein, and a packer head operatively mounted in the chamber for movement along a path, of a receptacle having a filling opening in a side thereof, guide members connected with the packer assembly and projecting forwardly therefrom substantially parallel to the path of said packer and in position to receive the receptacle thereon, said receptacle having locking shoulders beside the guide members and segments pivotally mounted on the guide members in positions for interlocking engagement with the shoulders to hold the receptacle in aligned relation with the packer assembly and to lock the receptacle against longitudinal movement along said guide members, a cross shaft mounted in operative relation with the packer assembly, and links operatively connecting the cross shaft with the segments for actuating the latter with respect to the guide members.

5. A stationary packer assembly comprising an elongated charging tube having an opening in a side thereof adapted to receive refuse, a packer head operatively mounted in the charging tube for reciprocating movement relative thereto, a material shield connected with the packer head and movable therewith across the opening during the movement of the head in one direction, said shield extending lengthwise of the charging tube in the upper portion thereof and having opposite edges, shoes connected with the opposite edges of the shield, and tracks extending lengthwise of the charging tube having the shoes of the shield mounted thereon for supporting the latter to move lengthwise of the charging tube.

6. A unitary and transportable packer assembly comprising a frame, a pair of laterally spaced guide members on the frame adapted to receive a separate container thereon, said container having an opening in the end thereof, means on the frame for forcing material in a direction lengthwise of the guide members under pressure through said opening into the container, and means connected with the guide members for locking the container against endwise displacement lengthwise of the guide members relative to said forcing means.

7. A unitary and transportable packer assembly comprising a pair of laterally spaced guide members adapted to receive a separate container thereon, said container having an opening in the end thereof, packer means for forcing material in a direction lengthwise of the guide members under pressure through said opening into the container, a supporting assembly for the packer means, said guide members being rigidly secured to said supporting assembly, and means connected with the supporting assembly for anchoring the container against endwise displacement lengthwise of the guide members from the packer means during the operation of said packer means.

8. A packer assembly comprising a pair of laterally spaced guide members adapted to receive a separate container thereon, said container having an opening in the end thereof, packer means for forcing material in a direction lengthwise of the guide members under pressure through said opening into the container, a supporting assembly for the packer means, and means connected with the supporting assembly for anchoring the container against endwise displacement lengthwise of the guide members from the packer means during the operation of said packer means, said anchoring means including a pair of lock members adapted for engagement with means connected with the container, a cross shaft having operative connection with the lock members and means for moving the cross shaft to move the lock members into and out of locking engagement with the container.

9. A packer assembly comprising an elongated undercarriage, packer means supported on one end portion of the undercarriage, said packer means including a packer head movable longitudinally of said undercarriage, a pair of guides mounted on the opposite end portion of the undercarriage and means for receiving a container thereon, said guides extending longitudinally of said undercarriage, and means for a temporarily securing together adjacent ends of the container and the packer means.

10. The combination with a stationary packer assembly comprising an elongated charging chamber adapted to receive refuse therein, guides extending lengthwise of the charging chamber, a packer head mounted on the guides and operating in the charging chamber lengthwise thereof, of an elongated receptacle extending lengthwise from an end of the charging chamber, said receptacle having an end wall toward the charging chamber with an inlet opening therein a registry with the charging chamber, said packer head guides extending through the opening and into the receptacle and guiding movement of the packer head in the receptacle for compressing the material therein.

11. The combination with a stationary packer assembly comprising an elongated charging chamber adapted to receive refuse therein, guides extending lengthwise of the charging chamber, a packer head mounted on the guides and operating in the charging chamber lengthwise thereof, of an elongated receptacle extending lengthwise from an end of the charging chamber, said receptacle having an end wall toward the charging chamber with an inlet opening therein in registry with the charging chamber, a wrapper plate secured to the receptacle around said inlet opening, said packer head guides extending through the opening inside the wrapper plate and inside the receptacle and guiding movement of the packer head in the receptacle for compressing the material therein, and a cover plate supported on the receptacle externally thereof in position to be moved to a closed position over the opening against the end of the wrapper plate.

12. The combination with a stationary packer assembly comprising an elongated horizontally disposed charging chamber adapted to receive refuse therein, a packer head operatively mounted in the charging chamber and movable lengthwise thereof, of an elongated receptacle extending lengthwise from an end of said charging chamber, said receptacle having an inlet opening in an end thereof in registry with an end of the charging chamber, an undercarriage connected with the charging chamber and including tracks extending to the charging chamber for guiding the receptacle along an axis extending lengthwise of the charging chamber into registry of said opening with the adjacent end of the chamber, means for operating the packer head parallel with said axis for compressing refuse into the receptacle, and means for locking the receptacle against movement along said axis in the opposite direction under impact of the packer head.

13. The combination with a stationary packer assembly comprising an elongated horizontally disposed charging chamber adapted to receive refuse therein, a packer head operatively mounted in the charging chamber and movable lengthwise thereof, of an elongated receptacle extending lengthwise from an end of said charging chamber, said receptacle having an inlet opening in an end thereof in registry with an end of the charging chamber, an undercarriage connected with the charging chamber and including tracks extending to the charging chamber for guiding the receptacle along an axis extending lengthwise of the charging chamber into registry of said opening with the adjacent end of the chamber, means for operating the packer head parallel with said axis for compressing refuse into the receptacle, and latch means extending transversely of the guiding means in positions for locking the receptacle against movement along said axis in the direction of compressing movement of the packer head.

14. The combination with a stationary packer assembly comprising an elongated horizontally disposed charging chamber adapted to receive refuse therein, a packer head operatively mounted in the charging chamber and movable lengthwise thereof, of an elongated receptacle extending lengthwise from one end of said charging chamber, said receptacle having an inlet opening in an end thereof in registry with an end of the charging chamber, a pair of guides extending lengthwise of the charging chamber and the receptacle and having the receptacle mounted thereon for movement along an axis parallel with the direction of movement of the packer head, locking segments extending transversely of said guides in position for locking the receptacle against movement in the direction of movement of the packer head, and means for releasing said locking segments.

(References on following page)

References Cited by the Examiner

UNITED STATES PATENTS

| | | | |
|---|---|---|---|
| 66,607 | 7/1867 | McGrann | 220—33 |
| 566,976 | 9/1896 | Forder | 100—215 |
| 884,450 | 4/1908 | Wright | 220—33 |
| 696,747 | 12/1928 | Dutzmann | 100—126 X |
| 2,591,970 | 4/1952 | Seegers et al. | 100—98 |
| 2,643,558 | 6/1953 | Lindemann et al. | 100—215 |
| 2,702,142 | 2/1955 | Jones | 220—34 |
| 2,782,710 | 2/1957 | Fishburne | 100—229 X |
| 2,934,198 | 4/1960 | Schonrock | 214—41 X |
| 2,941,690 | 6/1960 | Keys | 220—34 |
| 3,003,411 | 10/1961 | Judd | 100—295 X |
| 3,013,675 | 12/1961 | Schonrock | 214—41 |
| 3,049,250 | 8/1962 | Dempster et al. | 214—82 |
| 3,059,789 | 10/1962 | Bowles | 214—41 |
| 3,135,400 | 6/1964 | Tapp et al. | 214—41 |

FOREIGN PATENTS

| | | |
|---|---|---|
| 323,716 | 1/1930 | Great Britain. |

WALTER A. SCHEEL, *Primary Examiner.*

CHARLES WILLMUTH, *Examiner.*